United States Patent [19]

Kitaura et al.

[11] Patent Number: 5,220,411
[45] Date of Patent: Jun. 15, 1993

[54] SYNCHRONIZING PHASE SHIFT CORRECTED SYNCHRONOUS SIGNAL DETECTING APPARATUS

[75] Inventors: Hiromu Kitaura, Osakasayama; Takashi Inoue; Tokikazu Matsumoto, both of Osaka; Nobuyuki Ogawa, Takatsuki, all of Japan

[73] Assignee: Matsushita Electric Industrial Co., Ltd., Osaka, Japan

[21] Appl. No.: 713,156

[22] Filed: Jun. 11, 1991

[30] Foreign Application Priority Data

Jun. 14, 1990 [JP] Japan .................. 2-156890

[51] Int. Cl.⁵ .................. H04N 5/76; H04N 5/95
[52] U.S. Cl. .................. 358/19; 358/17; 358/337; 360/36.1; 360/36.2
[58] Field of Search .......... 369/50; 358/342, 319, 358/320, 322, 323, 324, 326, 337, 339, 342, 335, 17, 19, 148, 150; 360/36.1, 36.2, 19.1, 37.1

[56] References Cited

U.S. PATENT DOCUMENTS

| | | | |
|---|---|---|---|
| 4,733,311 | 3/1988 | Yoshinaka | 358/320 |
| 4,772,950 | 9/1988 | Furuhata et al. | 358/337 |
| 4,802,026 | 1/1989 | Kaneko et al. | 358/320 |
| 4,977,462 | 12/1990 | Takanashi et al. | 358/339 |
| 4,989,073 | 1/1991 | Wagner | 358/326 |
| 5,062,005 | 10/1991 | Kitaura et al. | 358/320 |

FOREIGN PATENT DOCUMENTS 63-280593 11/1988 Japan .

Primary Examiner—Andrew L. Sniezek
Assistant Examiner—Thang V. Tran
Attorney, Agent, or Firm—Wenderoth, Lind & Ponack

[57] ABSTRACT

In a system for eliminating time base fluctuation of a video signal having a synchronizing signal and a burst reproduced from a video disk, for example, the synchronism is first coarsely pulled in on the basis of the horizontal synchronizing signal and then precisely follows the time base fluctuation on the basis of the burst signal. A shift of the output synchronizing signal is corrected by using a phase detection of an input horizontal synchronizing signal when an output synchronizing signal is produced on the basis of the read address of a memory for eliminating time base fluctuation, thereby preventing, for example, a superimposed character using the output synchronizing signal from fluctuating on a picture.

4 Claims, 4 Drawing Sheets

SYNCHRONIZING PHASE SHIFT CORRECTED SYNCHRONOUS SIGNAL DETECTING APPARATUS

BACKGROUND OF THE INVENTION

1. Field of the Invention

The present invention relates to a synchronizing signal detecting apparatus of a reproducing apparatus for a video disk or other recording medium.

2. Description of a Prior Art

Conventionally, a digital time base corrector has been practically used which enables a video signal of a corrected time base to be obtained from a reproduced signal of a video disk, for example, having time base fluctuation such as jitter, by writing the reproduced signal in a digital memory in synchronism with the fluctuated time base and reading it with a fixed clock. In such an apparatus, a synchronizing signal drives a character generator for superimposing characters, for example, with an output signal. The synchronizing signal is separately detected in analog form from the video signal of the corrected time base. The reason for this is as follows.

Usually, in a steady state the digital time base corrector detects time base fluctuation not based on a horizontal synchronizing signal of the input video signal but instead based only on a burst signal. Therefore, in the case where the signal is recorded on the disk so that a phase of the burst signal in the video signal is shifted at a portion where a picture is changed to another picture (e.g., a program is changed to another program), or in the case where a burst phase detecting circuit for detecting time base error is locked in a condition shifted by integral times of 360 degrees of the burst phase, the location of the video signal written on the memory for time base correction is changed. Thus, if the character for super-imposition is produced in accordance with a synchronizing signal generated on the basis of a read address of the memory, the location of the character relative to the video signal is changed. Accordingly, it is necessary to detect the synchronizing signal for generating characters not on the basis of the memory address, but instead on the basis of the analog signal converted from the video signal after correcting the time base. This causes a problem in that the size of the circuit becomes large, and it is impossible to process the entire signal digitally.

SUMMARY OF THE INVENTION

It is an object of the invention to provide a synchronizing signal detecting circuit which does not synchronizing signal detecting analog operation circuit and which is able to accurately detect the synchronizing signal in digital form and supply the synchronizing signal to the character generator, for example.

In order to achieve the above-mentioned object, a synchronizing signal detecting apparatus according to the present invention comprises a reproducing means for reproducing a signal recorded on a recording medium, a first phase detecting means for detecting a phase of a first synchronizing signal detected from a reproduced signal, means for analog-digital converting the reproduced signal, a second phase detecting means for detecting a phase of a burst signal of an output of the analog-digital converting means, phase synchronous oscillating means controlled by outputs of the first and second phase detecting means, synchronism shift amount detecting means for converting the output of the first phase detecting means to a corresponding number of clocks of an output clock of the phase synchronous oscillating means, digital memory means for eliminating a time base error from the output of the analog-digital converting means, means for generating a read address signal for the digital memory means, and synchronizing signal producing means for producing a second synchronizing signal using the outputs of the address signal generating means and synchronism shift amount detecting means.

According to the invention, the horizontal synchronizing signal produced on the basis of a read address counter of the memory for time base correction is always obtained in coincidence with the output video signal of the corrected time base.

DESCRIPTION OF THE PREFERRED EMBODIMENTS

Figure 1:
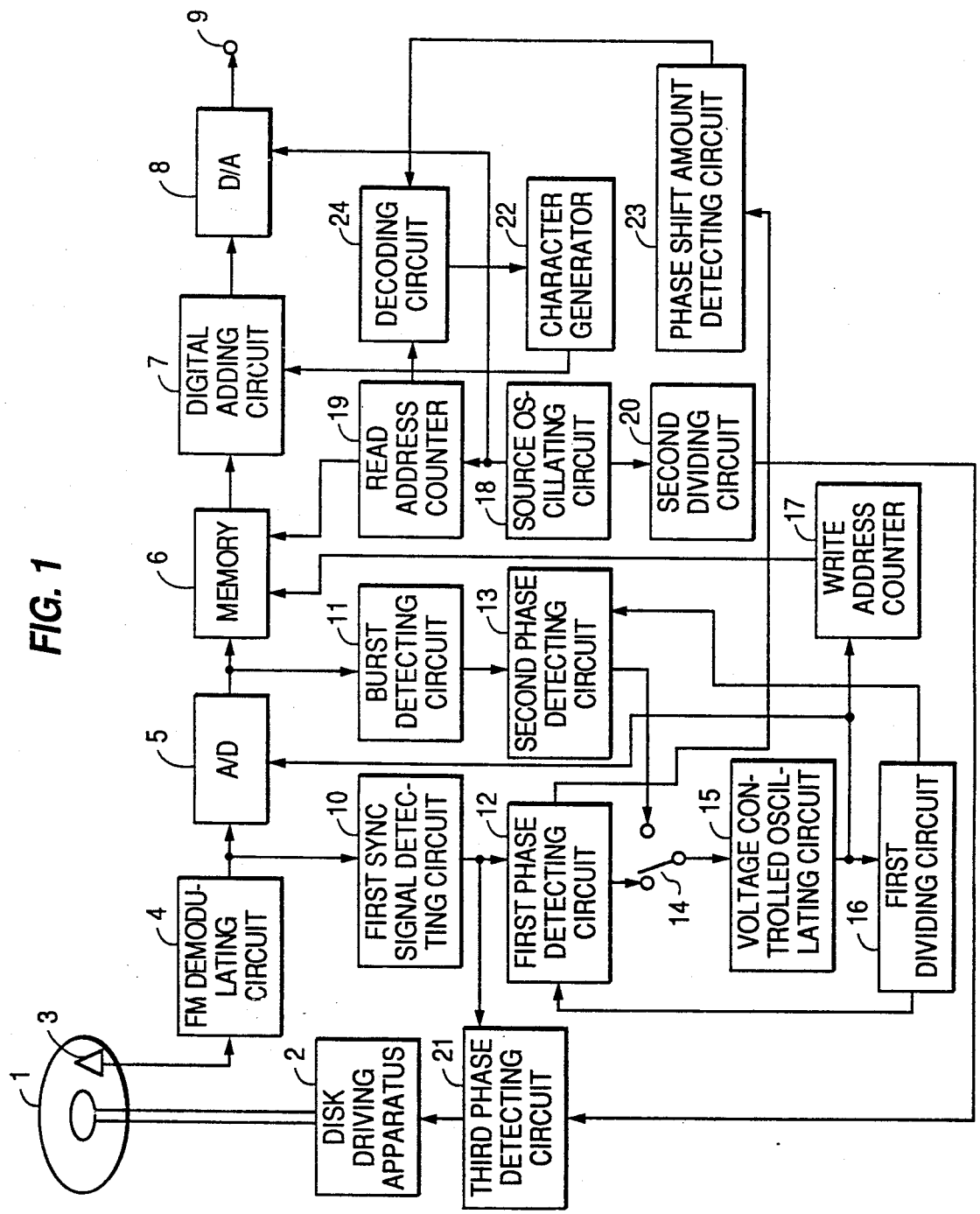
FIG. 1 is a block diagram showing a first embodiment of the invention.

FIG. 1 shows a first embodiment of the invention.

Referring to this figure, 1 denotes a video disk, and 2 denotes a disk driving apparatus which comprises a motor and a motor driving circuit and rotates the disk 1. 3 denotes a pickup which reads out a signal from the video disk 1, and 4 denotes a FM demodulating circuit which demodulates a modulated signal detected by the pickup 3 to an original video signal. 5 denotes an analog-digital converter (A/D) which converts the demodulated signal to a digital signal. 6 denotes a memory into which the output signal of the A/D 5 is written with a clock synchronized with the demodulated signal of a fluctuated time base and from which the signal is read with another clock of a steady time base, so as to obtain a digital video signal of a corrected time base. 7 denotes a digital adding circuit for adding digitally a character signal generated as a digital signal. 8 denotes a digital-analog converter (D/A) which demodulates the digital video signal to the original analog signal. 9 denotes an output terminal of the reproduced video signal. 10 denotes a first synchronizing signal detecting circuit which detects a horizontal synchronizing signal in analog form from the demodulated video signal. 11 denotes a burst detecting circuit which detects a burst digitally from the digital converted video signal. 12 denotes a first phase detecting circuit which detects and outputs a phase difference between the horizontal synchronizing signal supplied from the first synchronizing signal detecting circuit 10 and a horizontal synchronizing pulse produced by frequency dividing a clock signal of an output of a later-described voltage controlled oscillating circuit 15. 13 denotes a second phase detecting circuit which detects and outputs a phase difference between the burst signal supplied from the burst detecting circuit 11 and a burst pulse produced by frequency dividing the clock signal output from the voltage controlled oscillating circuit 15. 14 denotes a selector circuit which switches the outputs of the first and second phase detecting circuits 12 and 13 and supplies the selected output to the voltage controlled oscillating circuit 15.

In the above-mentioned construction, the two phase detecting circuits 12 and 13 are selectively used so that the synchronism is first coarsely pulled in on the basis of the horizontal synchronizing signal and thereafter precisely follows the time base fluctuation on the basis of the burst signal.

The voltage controlled oscillating circuit 15 is controlled in its oscillation frequency and phase by an externally supplied voltage. 16 denotes a first dividing circuit which divides the frequency of the output clock signal of the voltage controlled oscillating circuit 15 to obtain the horizontal synchronizing pulse and the burst pulse, and supply them to the first and second phase detecting circuits 12 and 13. 17 denotes a write address counter which is driven with the output clock of the voltage controlled oscillating circuit 15 and generates a write address for the memory 6 on the basis of the horizontal synchronizing pulse. 18 denotes a source oscillating circuit which generates a stable clock which is free from time base fluctuation. 19 denotes a read address counter which is driven by the clock obtained from the output of the source oscillating circuit 18 and supplies a read address for the memory 6. 20 denotes a second dividing circuit which divides the output clock of the source oscillating circuit 18 to obtain a standard horizontal synchronizing pulse. 21 denotes a third phase detecting circuit which compares the phase of the standard horizontal synchronizing pulse with the phase of the horizontal synchronizing signal of the output of the first synchronizing signal detecting circuit 10 and controls the disk driving apparatus 2 responsive to the thus obtained phase difference signal. 22 denotes a character generator which generates data such as characters, for example to be superimposed with the video signal by the adding circuit 7.

Figure 2:
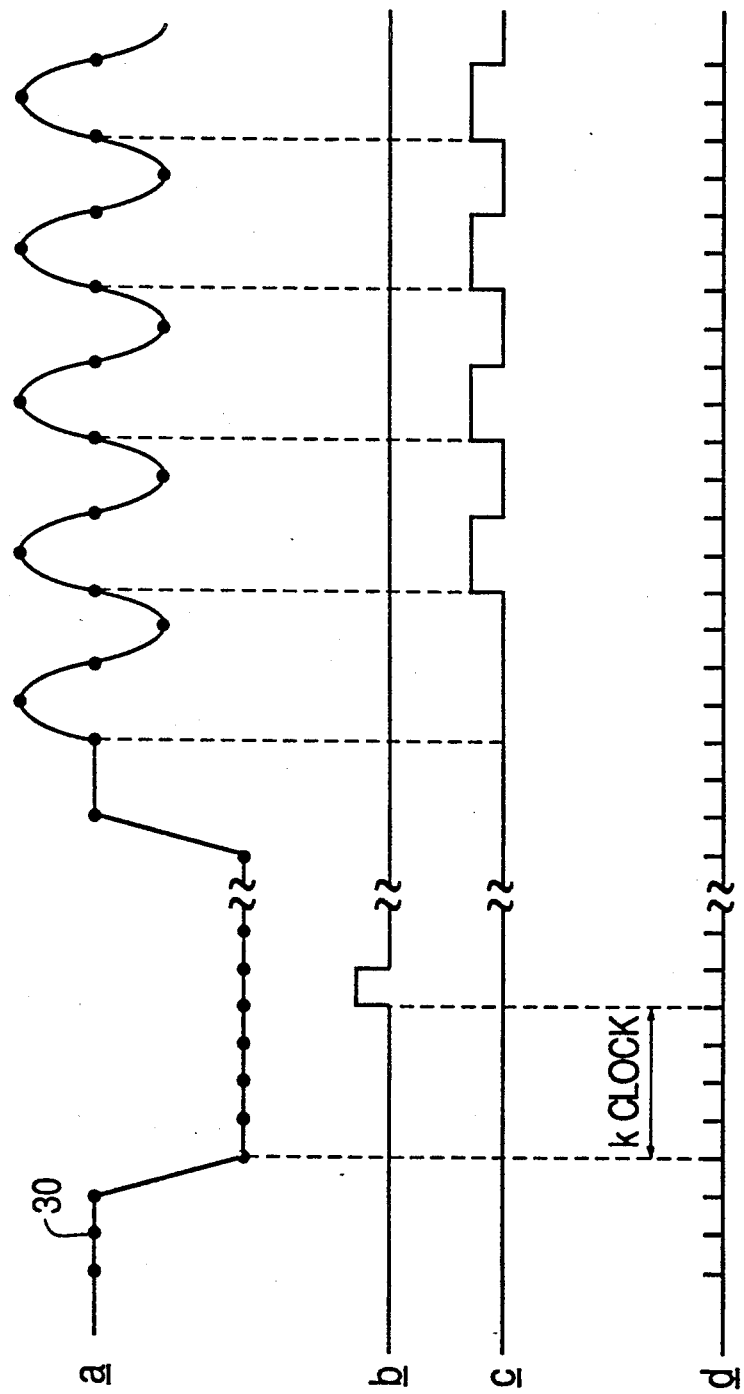
FIGS. 2 (a-d) are a chart showing timings of signals.

23 denotes a phase shift amount detecting circuit which converts the phase shift detecting output of the first phase detecting circuit 12 to a corresponding number of clocks and outputs it. An actual embodiment thereof is explained hereinafter, referring to FIG. 2. In FIG. 2, waveform a shows the reproduced video signal of the fluctuated time base, and 30 denotes a digital sampling point. Waveforms b and c show the horizontal synchronizing pulse and the burst pulse, respectively, produced by the first dividing circuit 16. Waveform d shows the clock signal supplied from the voltage controlled oscillating circuit 15. In the case where the frequency of the clock signal is set four times as large as that of the burst frequency, the burst pulse c has a period of four clock periods as shown in the figure. Therefore, in the steady state, i.e. the state in which the switch 14 is connected to the side of the output terminal of the second phase detecting circuit 13, since time base correction is operated only on the basis of the burst, pulse a shift which is integral times the burst period, i.e. 4-clock unit, cannot be detected. On the other hand, since the first phase detecting circuit 12 outputs the detected signal denoting the phase difference between the horizontal synchronizing signal and the horizontal synchronizing pulse, it is possible to convert this phase difference to a value k (k represents a positive or negative integer) by the synchronism shift amount detecting circuit 12 as shown in FIG. 2. In connection with FIG. 2, in the case where the time base correction is operated only in response to the burst phase, if a phase shift of the burst signal occurs in relation to the synchronizing signal of the reproduced video signal, the phase of the synchronizing pulse is also shifted. However, no problem is presented, because the shift amount is detected.

Referring again to FIG. 1, 24 denotes a decoding circuit which decodes a particular address number from the output of the read address counter 19 and outputs it as a horizontal synchronizing signal for the character generator 22. A vertical synchronizing signal for character is produced by another circuit which is not shown in the figure. For example, if normally the address j (j represents an integer) is to be decoded as the synchronizing signal, correspondingly to the output k of the synchronism shift amount detecting circuit 23 address (j-k) is produced as the synchronizing signal. Thus, even if the location of the synchronizing signal of the video signal read from the memory is shifted from that of the read address, the synchronizing signal for the character generator 22 is always located at the same position as that of the synchronizing signal of the video signal.

The reason for once converting to a value of 1 clock unit by the synchronism shift amount detecting circuit 23 is that the detected phase difference amount cannot be used directly in the reading side, because of a time base shift between the writing side and the reading side of the memory 6 due to the effect of time base correction.

Figure 3:
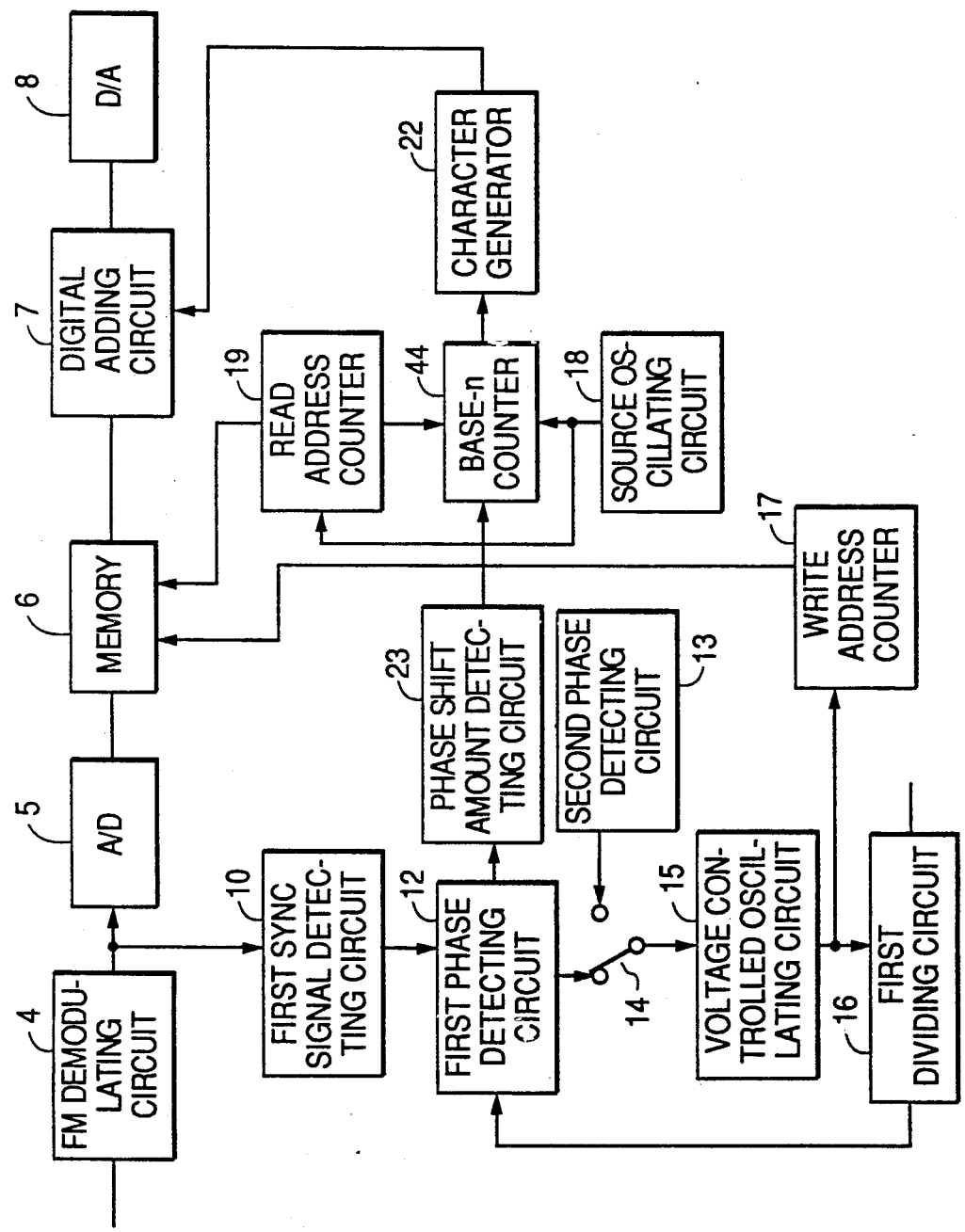
FIG. 3 is a block diagram showing a second embodiment of the invention.

A second embodiment is explained hereinafter, referring to FIG. 3. In this figure, 44 denotes a base-n counter (n represents a positive integer) which counts the clock supplied from the source oscillating circuit 18. This base-n counter starts counting at the moment when the address of the read address counter 19 becomes a particular value, i.e. number j, or starts counting by a starting signal which is a repeated signal having the same period as that of the read address such as a counter reset pulse or load pulse of the address counter obtained from the read address counter 19, and counts until an n count, to output the horizontal synchronizing signal for the character generator 22 and then stops until the next start signal arrives. A vertical synchronizing signal for the character generator 22 is produced by another circuit which is not shown. At that time the counter value is made (n-k) by the use of the output value k of the synchronism shift amount detecting circuit 23. According to this construction, the size of the circuit is reduced compared with the first embodiment in which it is necessary to vary the decode value.

Figure 4:
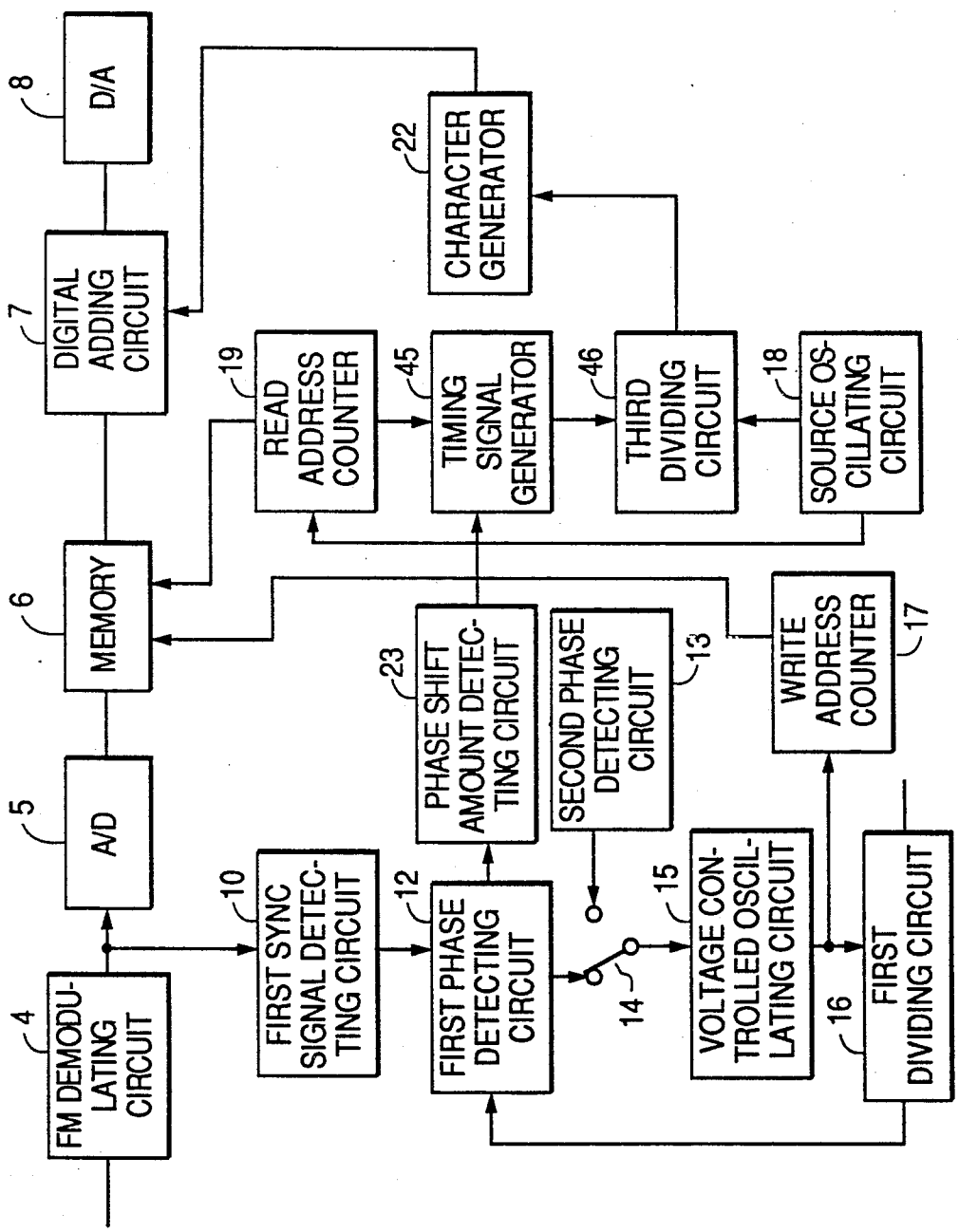
FIG. 4 is a block diagram showing a third embodiment of the invention.

A third embodiment is described hereinafter, referring ring to FIG. 4. 45 denotes a timing pulse generating circuit which generates a reset timing pulse. The construction thereof is the same as that of the base-(n-k) counter described in the second embodiment. 46 denotes a third dividing circuit which produces the horizontal and vertical synchronizing signals from the output clock of the source oscillating circuit 18. It is composed of base-h and base-v (h and v are positive integers) self-start counters. The values of h and v are constant and set so as to enable the horizontal and vertical synchronizing signals to be obtained. The synchronizing signal obtained from the third dividing circuit 46 is supplied to the character generating circuit 23.

This third embodiment has a composition of varying the reset position of the third dividing circuit which is used for producing the horizontal and vertical synchronizing signals, in contrast to the first and second embodiments which only produce the horizontal synchronizing signal for the character generator 22.

Although the above-mentioned embodiments are described as an apparatus for generating synchronizing signal for a character generator, the invention can be also used for producing a synchronizing signal for controlling a memory used to operate another signal processing, circuit for example, special effect reproduction such as still or slow, motion which is carried out to the video signal after the time base correction is made.

Further although the above-mentioned description has been made referring to the video disk, this invention can be applied for a time base corrector of all other recording and reproducing apparatus.

What is claimed is:

1. A synchronizing signal detecting apparatus comprising:
   reproducing means for reproducing from a recording medium a video signal recorded on the recording medium to obtain a reproduced video signal;
   synchronizing signal detecting means for detecting from the reproduced video signal a synchronizing signal of the reproduced video signal;
   first phase detecting means for detecting a phase difference between the synchronizing signal and a first phase reference signal and outputting a first phase difference signal indicative of the detected phase difference;
   analog-digital converting means for converting the reproduced video signal to a digital video signal;
   burst signal detecting means for digitally detecting from the digital video signal a burst signal of the reproduced video signal;
   second phase detecting means for detecting a phase difference between the burst signal and a second phase reference signal and outputting a second phase difference signal indicative of the detected phase difference;
   phase synchronous oscillating means selectively controlled by the first and second phase difference signals for generating a first clock signal;
   frequency dividing means for dividing a frequency of the first clock signal to obtain the first phase reference signal when said phase synchronous oscillating means is controlled by the first phase difference signal and to obtain the second phase reference signal when said phase synchronous oscillating means is controlled by the second phase difference signal;
   synchronism shift amount detecting means for converting the phase difference detected by said first phase detecting means to a corresponding number of clocks of the first clock signal;
   write address generating means responsive to the first clock signal for generating a write address signal;
   fixed clock generating means for generating a second clock signal which has a fixed phase;
   read address generating means responsive to the second clock signal for generating a read address signal;
   digital memory means responsive to the write address signal for writing thereinto the digital video signal and responsive to the read address signal for reading therefrom the written digital video signal to thereby eliminate a time base error from the digital video signal; and,
   synchronizing signal producing means for producing a corrected synchronizing signal which is corrected of synchronism shift from an output of said read address generating means and an output of said synchronism shift amount detecting means.

2. A synchronizing signal detecting apparatus as claimed in claim 1, wherein said synchronizing signal producing means comprises decoding means for decoding the output of said read address generating means to a predetermined decode value, said decoding means correcting the predetermined decode value according to the output of said synchronism shift amount detecting means.

3. A synchronizing signal detecting apparatus as claimed in claim 1, wherein said synchronizing signal producing means comprises a counter responsive to the output of said read address generating means, for starting a counting of clocks of the second clock signal until a resultant count value becomes a predetermined count value, said counter varying the predetermined count value according to the output of said synchronism shift amount detecting means.

4. A synchronizing signal detecting apparatus as claimed in claim 1, wherein said synchronizing signal producing means comprises a frequency dividing circuit for frequency-dividing the second clock signal to obtain the corrected synchronizing signal, and reset signal generating means for generating from the output of said read address generating means a reset signal for resetting the frequency dividing circuit, said reset signal generating means varying a reset timing of the reset signal according to the output of said synchronism shift amount detecting means.

* * * * *